June 14, 1949.　　　　K. H. MILLER　　　　2,472,981
WALL PANEL JOINT CONSTRUCTION
Filed March 27, 1946　　　　2 Sheets-Sheet 1
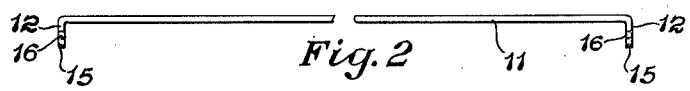
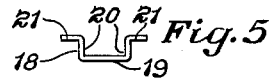
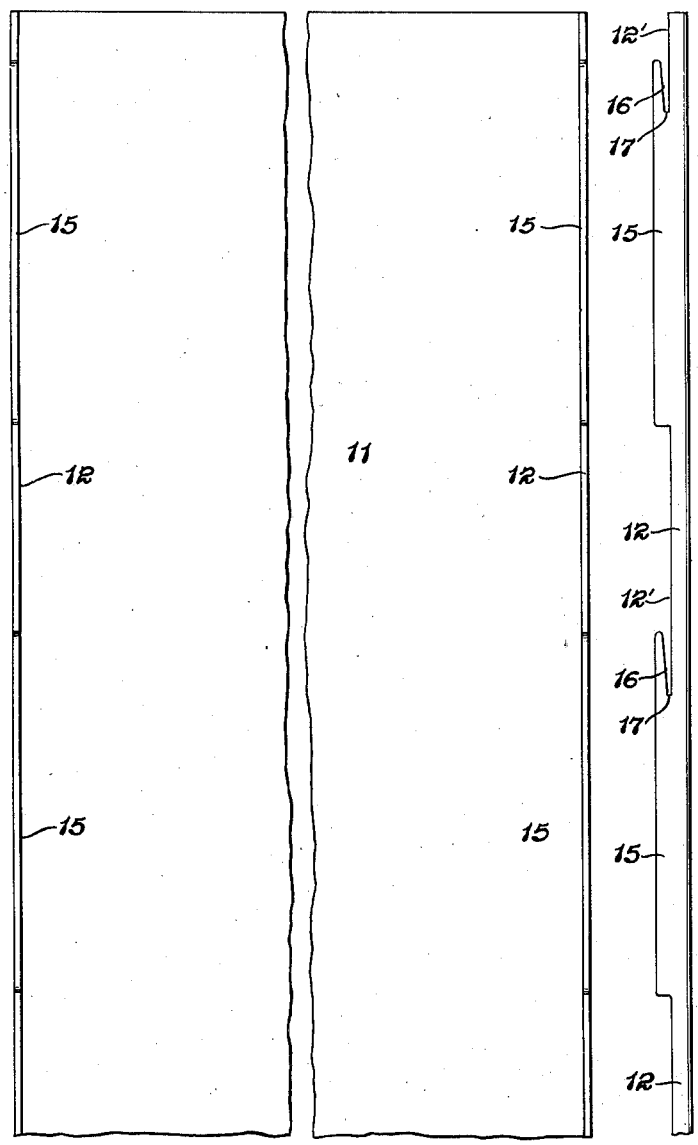
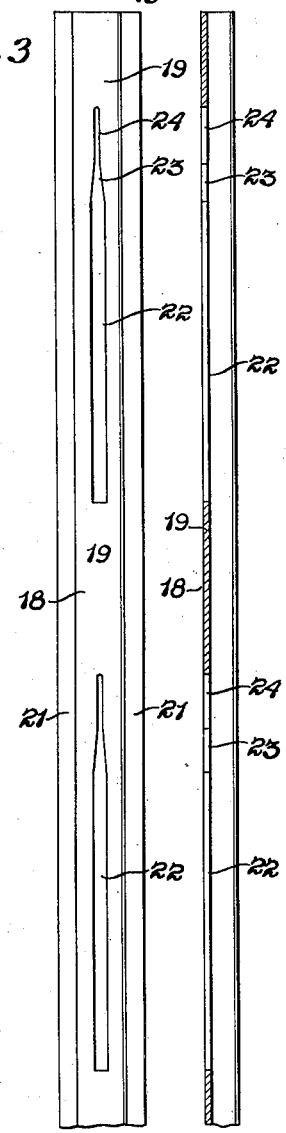
INVENTOR.
Karl H. Miller
BY
Frease and Bishop
ATTORNEYS

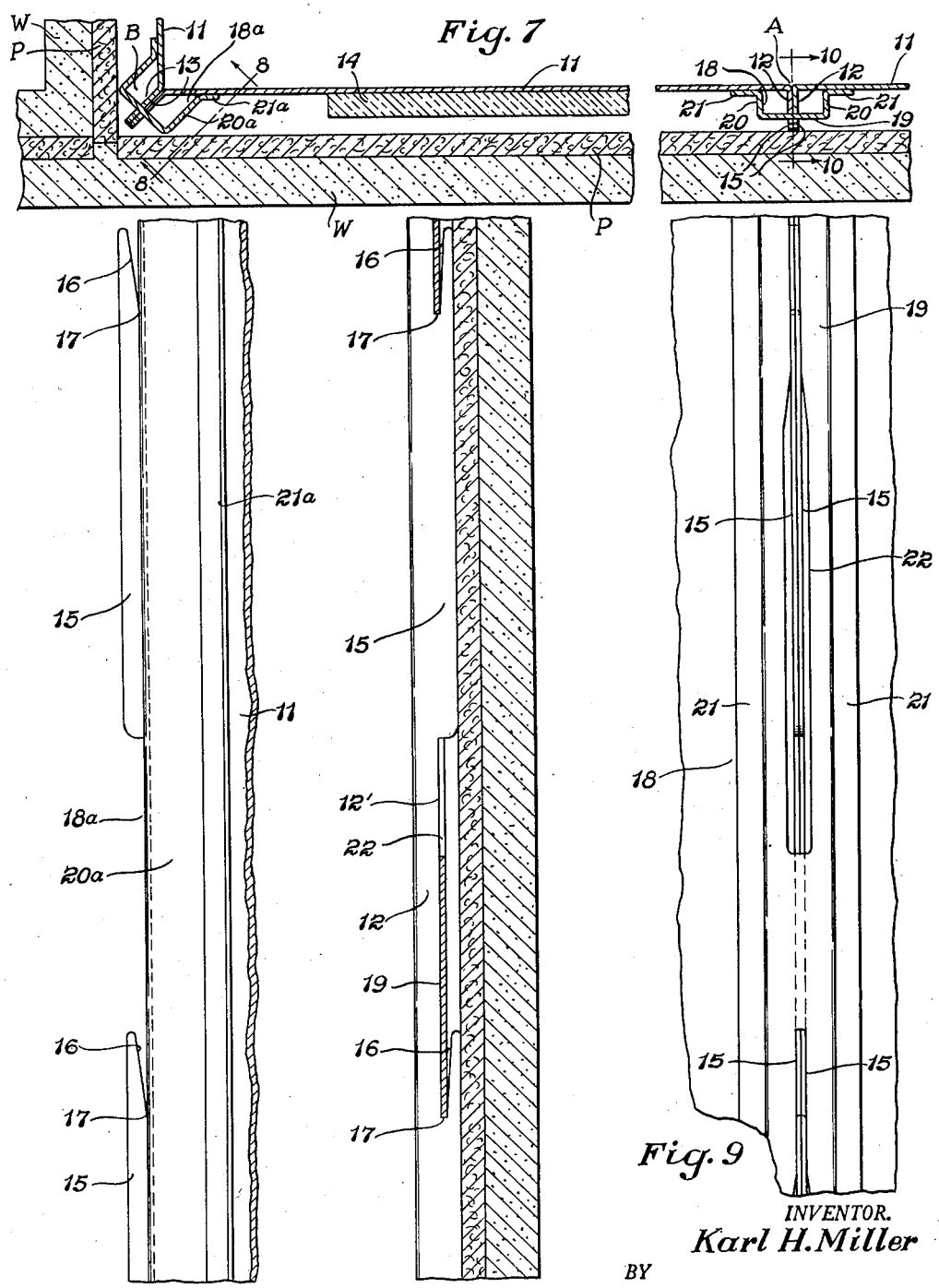

Patented June 14, 1949

2,472,981

UNITED STATES PATENT OFFICE 2,472,981

WALL PANEL JOINT CONSTRUCTION

Karl H. Miller, North Canton, Ohio, assignor to Diebold, Incorporated, Canton, Ohio, a corporation of Ohio Application March 27, 1946, Serial No. 657,444

5 Claims. (Cl. 189—36)

The invention relates generally to the joints between metal wallpanels, and more particularly to a joint construction for prefabricated metal wall panels which enables rapid erection of the panels to provide tight joints.

Certain prior joint constructions for wall panels have included a plurality of screws, bolts or clips for each joint and the fastening of such devices requires considerable time and labor. Moreover, such devices are likely to become lost or misplaced in transit or in the course of installation, and their installation usually requires the use of tools.

In many of such prior constructions the attaching devices are at least partially visible from the inside of a wall made up of such panels, and in spite of the joint fastening means, difficulty is had in getting the joint surfaces lined up or tightly abutted together or both. Fastening devices have been proposed which draw the joint surfaces tightly together, but such devices require the joint surfaces to be lined up accurately before they can be applied.

It is a general object of the present invention to provide a novel and improved wall panel joint construction which overcomes all of the foregoing disadvantages.

More specifically, it is an object of the present invention to provide a joint construction which is adapted to be assembled rapidly in the course of erecting the wall panels, without requiring the use of tools other than an ordinary hammer.

Another object is to provide a novel joint construction for wall panels which does not require the use of a plurality of screws, bolts, clips or the like.

A further object is to provide a novel joint construction for wall panels which enables quick and easy assembly of the panels, and which does not expose any part of the fastening means to view from the inside of the finished room.

Another object is to provide a novel joint construction which is applicable to the side and top corners of a room, as well as to the intermediate joints between panels.

A still further object is to provide a novel and improved wall panel joint construction, which, during the assembling operation, automatically lines up the joint surfaces accurately and simultaneously draws them tightly together to provide a tight joint.

Finally, it is an object of the present invention to provide a novel and improved joint construction which is extremely simple and inexpensive to manufacture and easy to assemble in a minimum of time.

These and other objects are accomplished by the parts, elements, constructions, arrangements, and combinations, which comprise the present invention, the nature of which is set forth in the following general statement, preferred embodiments of which are set forth in the following description and illustrated in the accompanying drawings, and which is particularly and distinctly pointed out and set forth in the appended claims forming part hereof.

In general terms, the invention may be stated as including in combination, metal wall panels having angular flanges at their edges for abutting like flanges on adjoining panels, said flanges having co-planar projecting tongues at longitudinal intervals thereon, one end of each of said tongues being provided with a longitudinally disposed wedge-shaped notch, and a longitudinal channel locking strip for each joint having keyhole slots at longitudinal intervals therein for receiving abutting pairs of the said tongues, said slots being wedge-shaped for drawing abutting panel flanges tightly together and being adapted to engage in said wedge-shaped slots for aligning said panel flanges when the strip is moved longitudinally of the panel flanges.

Referring to the drawings forming part hereof, in which preferred embodiments of the invention are shown by way of example:

Figure 1 is a fragmentary front elevational view of a metal wall panel having improved angular flanges at opposite side edges thereof for cooperating with a novel locking strip to provide the improved joint construction;

Fig. 2 is an end view thereof;

Fig. 3 is a side elevation thereof, showing the construction of the tongues projecting at intervals from the flanges;

Fig. 4 is a front elevation of the novel locking strip;

Fig. 5 is an end elevation thereof;

Fig. 6 is a longitudinal sectional view thereof;

Fig. 7 is an enlarged fragmentary horizontal sectional view showing one corner and part of an adjoining wall of a room made up of metal wall panels and including the novel joint construction;

Fig. 8 is a fragmentary view substantially on line 8—8, Fig. 7, showing a novel corner joint in elevation;

Fig. 9 is a rear elevation of one of the improved wall joints, taken between the metal wall and the adjoining plaster wall backing up the same; and Fig. 10 is a longitudinal sectional view as on line 10—10, Fig. 7.

Similar numerals refer to similar parts throughout the drawings.

Referring first to Figs. 1, 2 and 3, the metal wall panels which are assembled on the job to make a small room, such as a bathroom or a closet in a residence, are preferably prefabricated from sheet metal and include the panel section 11 having angular or outturned flanges 12 at opposite side edges thereof. When a plurality of the panels 11 are placed side-by-side in a wall, the flanges 12 are adapted to abut like flanges on adjoining panels to form longitudinal joints between the panels, as indicated in cross section at the joint A in Fig. 7.

As shown, the flanges 12 are turned outwardly at right angles to the panels 11 so that all that is visible from the inside of a room is the line of abutment between the flanges 12. The panels 11 which form the corners of the room may each have the flange at one side turned angularly outward at 45° instead of 90° as indicated at 13 to form the corner joint shown at B in Fig. 7. This corner joint construction may also be used at the joints between the side wall and ceiling panels if desired. As indicated in Fig. 7, the wall panels 11 may have smaller panels of insulation or sound absorbing material 14 glued or otherwise attached to their exterior surfaces so as to diminish reverberation within the metal room when assembled.

As best shown in Figs. 3 and 10, the flanges 12 are provided at longitudinal intervals with coplanar rearwardly projecting tongues 15, and the tongues 15 on all flanges 12 are adapted to match or register with each other when the adjoining panels are abutted and lined up. One end of each tongue 15, preferably the upper end in the case of side wall panels such as the panel shown in Figs. 1, 2 and 3, has an outwardly tapered portion resulting in a longitudinally disposed wedge-shaped slot 16, one edge of the slot being formed by the rear edge 12' of the flange 12, and the other inclined edge of the slot being the edge of the tapered portion. At its smaller or closed end 17 the slot has a width substantially equal to the thickness of the metal of a longitudinal locking strip 18 which engages in the slots.

As indicated in Figs. 5 and 7, each locking strip 18 is of channel or U-shape in cross section, and has a web 19 with legs 20 at right angles thereto and outturned flanges 21 at right angles to the legs. The web 19 is provided at longitudinal intervals corresponding to the intervals between the tongues 15 with slots 22, and the slots 22 are each adapted to receive a pair of the tongues 15 of adjoining panels when the tongues are in register and abutting each other, as indicated in Figs. 7 and 9.

As shown in Figs. 3 and 4, the slots 22 are made long enough so that after they are fitted over abutting pairs of tongues 15, the strip 18 can be moved a short distance longitudinally, in a downward direction in the case of the side wall panels so as to engage the upper end of the slot 22 under the slots 16 in the upper ends of the abutting tongues 15. Thus, referring to Figs. 3 and 4, when the locking strip 18 is placed over the abutting tongues 15, it is placed over the tongues with the bottom of the slot 22 at the bottom of the tongues, and when the web 19 of the strip engages the rear edges 12' of the abutting flanges, the strip is then forced longitudinally, or downwardly as viewed in Fig. 4, to engage the top of each slot 22 with the bottoms 17 of the slots 16.

The slots 22 are widened throughout most of their lengths to slip easily over the abutting tongues 15, and are tapered inwardly near the top ends as indicated at 23 to form a narrow slot 24 which will tightly engage the outer surfaces of abutting tongues 15 when they are in tight abutment with each other. Thus, as the locking strip 18 is moved longitudinally downward on the rear edges of the abutting flanges 12, the tapered or wedge shape 23 of each keyhole slot will draw the abutting flanges 12 tightly together to form a tight joint throughout their length. At the same time, the wedge shape of the slots 16 engages the upper end of the narrow portion 24 of the slot 22 and draws or wedges the abutting flanges 12 and their tongues 15 in a direction at right angles to the plane of the panels 11 so as to bring them into co-planar alignment with each other.

In the case of corner joints, obviously the wedge engagement between the edges of slots 16 and 24 will draw the flanges 13 in a direction at 45° to the panels to bring them into alignment. The locking strips 18a for the corner joints are similar to the locking strips 18, the only structural difference being that the outturned flanges 21a are at 45° angles with the legs 20a, so as to abut the corner panels positioned at right angles to each other.

In erecting a room made up of prefabricated panels 11 the only fastening devices required to make the joint connections between panels are the locking strips 18 for the intermediate joints and the locking strips 18a for the corner joints. When it is desired to erect or install a room made up of these prefabricated metal panels in a residence or dwelling, the installation is made after the house has been framed, and before the partition walls have been built. The panels are then positioned in the desired location to form the walls of a room, with their adjoining edge flanges 12 in abutment, and each panel is quickly and easily fastened tightly with the adjoining panels in accurate alignment, by applying one of the strips 18 or 18a. The only tool that is required is an ordinary hammer which may be used to drive the locking strip longitudinally after the tongues 15 have been received in the slots 22, so as to bring the slots into the wedge clamping position of Figs. 7 to 10 inclusive, after which no part of the locking strips is visible from inside the room.

The locking strips, being the same length as the panels, they are easily packed and shipped with the panels without danger of becoming lost either in transit or in the course of installation, and only one fastening strip is required for each joint. Because of the two-way wedging action between the locking strips and the tongues, the joints are quickly and easily clamped tightly in accurate alignment without requiring extra time and labor to line up the panels and then to fasten them in aligned position.

Due to the fact that the corner locking strips 18a are applied in the same fashion at the side and top corners, the side walls and ceiling panels are quickly erected so as to complete the room in a minimum of time. After the metal room is completely erected, the exterior edges of the joints may be sealed with a suitable caulking compound or filler material, or such material may be applied to one joint surface before assembly, to insure a tight seal between the abutting surfaces of the joints, and plaster board panels, as indicated at P in Fig. 7, may be quickly erected with their inner surfaces abutting the outer edges of the abutting tongues 15 at each intermediate joint. As shown, the dimensions of the strips 18a at the corner joint may be such that the exterior corner edges of the strip are in substantial abutment with adjoining corner panels P of plaster board. After the plaster board panels have been positioned entirely around the room formed of the prefabricated metal panels 11, the plaster walls W of adjoining rooms can be applied thereto in a usual fashion.

The improved joint construction consists of a minimum number of elements which are simple and inexpensive to manufacture, and the joint is quickly and easily assembled.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention, the construction, the operation and use of preferred embodiments thereof, and the advantageous new and useful results obtained thereby; the new and useful constructions and reasonable mechanical equivalents thereof obvious to those skilled in the art, are set forth in the appended claims.

I claim:

1. Wall panel joint construction including abutting panel flanges coextensive with said joint, matching projections on said flanges, each projection having at its upper end an outwardly tapered portion, and a channel locking strip having tapered slots in its web receiving abutting pairs of said projections with those portions of the web forming the edges of the slot wedgeably engaging the sides of said projections for drawing them together, and other portions of the web adjacent the upper end of the slot in engagement with the tapered portions at the upper ends of the projections for aligning the panels.

2. Wall panel joint construction including abutting panel flanges coextensive with said joint, matching projections on said flanges, each projection having at its upper end an outwardly tapered portion, and a channel locking strip having tapered slots in its web receiving abutting pairs of said projections with those portions of the web forming the edges of the slot wedgeably engaging the sides of said projections for drawing them together, and other portions of the web adjacent the upper end of the slot in engagement with the tapered portions at the upper ends of the projections for aligning the panels, the legs of said channel locking strip having outturned flanges for engaging adjoining panels when they are aligned.

3. Wall panel joint construction including abutting panel flanges coextensive with said joint, matching co-planar tongues projecting from said flanges and having tapered portions at one end, and a channel locking strip engaging said tongues in two lines of force at right angles to each other, said locking strip having a slot in its web receiving an abutting pair of said tongues with those portions of the web forming the edges of the slot wedgeably engaging the sides of the tongues so that when the strip is moved longitudinally of the tongues it will draw the tongues together, and said web having portions engaging the tapered tongue portions for aligning the tongues.

4. Wall panel joint construction including abutting panel flanges coextensive with said joint, matching co-planar tongues projecting from said flanges at longitudinal intervals, each of said tongues having a tapered portion at one end, a channel locking strip for each pair of abutting panel flanges having slots in its web at longitudinal intervals for receiving abutting pairs of said tongues with the web portions forming the edges of the slots wedgeably engaging the sides of the abutting tongues for drawing them together, and other portions of the web engaging said tapered tongue portions for aligning the panels.

5. Wall panel joint construction including abutting panel flanges coextensive with said joint, matching co-planar tongues projecting from said flanges at longitudinal intervals, each of said tongues having a tapered portion at one end, a channel locking strip for each pair of abutting panel flanges having slots in its web at longitudinal intervals for receiving abutting pairs of said tongues with the web portions forming the edges of the slots wedgeably engaging the sides of the abutting tongues for drawing them together, and other portions of the web engaging said tapered tongue portions for aligning the panels, and the legs of said channel locking strip having outturned flanges for engaging adjoining panels when they are aligned.

KARL H. MILLER.

REFERENCES CITED

The following references are of record in the file of this patent:

UNITED STATES PATENTS

| Number    | Name            | Date           |
|-----------|-----------------|----------------|
| 1,167,221 | Rice            | Jan. 4, 1916   |
| 1,575,705 | Oberdorfer et al. | Mar. 9, 1926 |
| 1,681,074 | Wheat           | Aug. 14, 1928  |
| 2,014,419 | Voigt           | Sept. 17, 1935 |
| 2,182,523 | Markowski       | Dec. 5, 1939   |